(No Model.) 5 Sheets—Sheet 1.
G. A. WATKINS.
CANE SPLICING MACHINE.
No. 452,248. Patented May 12, 1891.
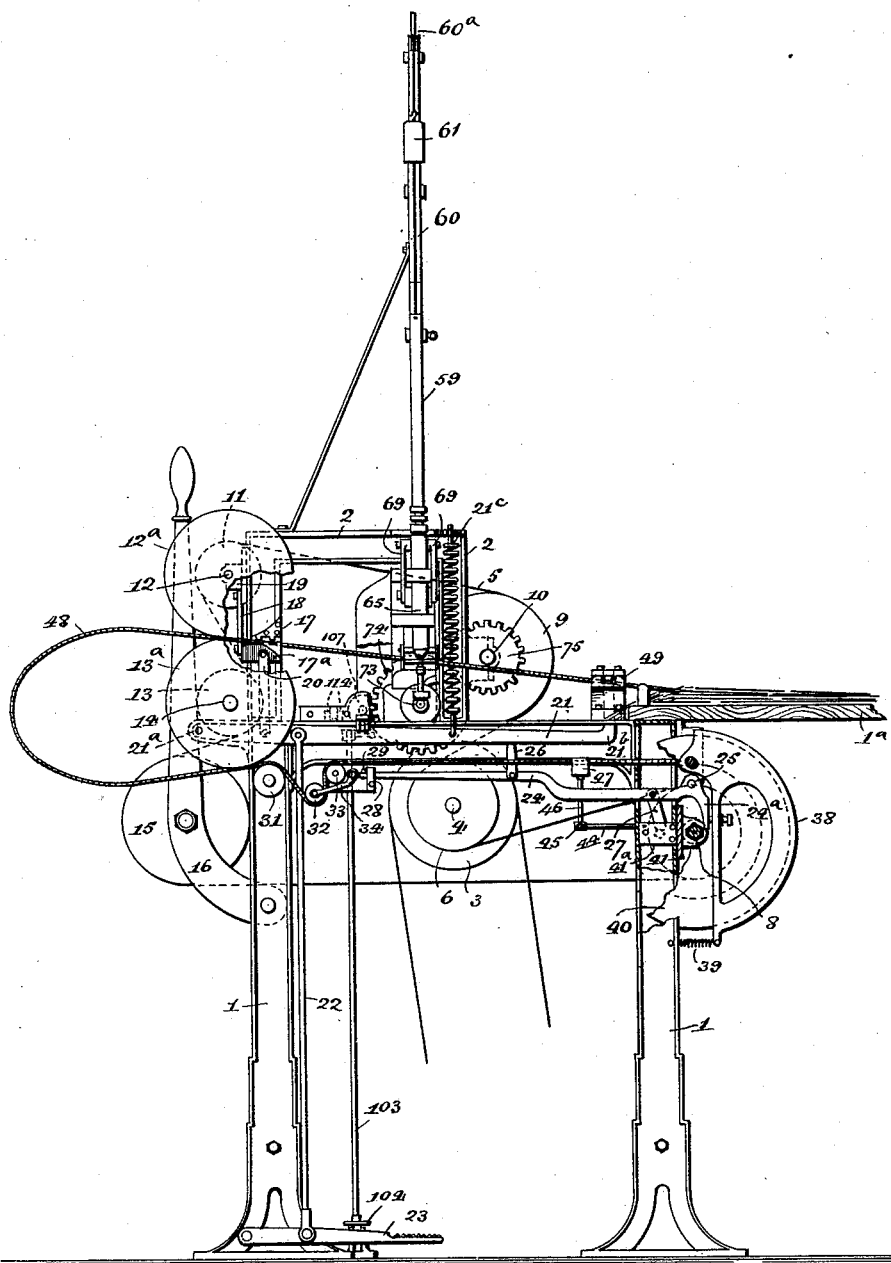
WITNESSES:
H. Walker
C. Sedgwick
INVENTOR:
G. A. Watkins
BY
Munn & Co
ATTORNEYS

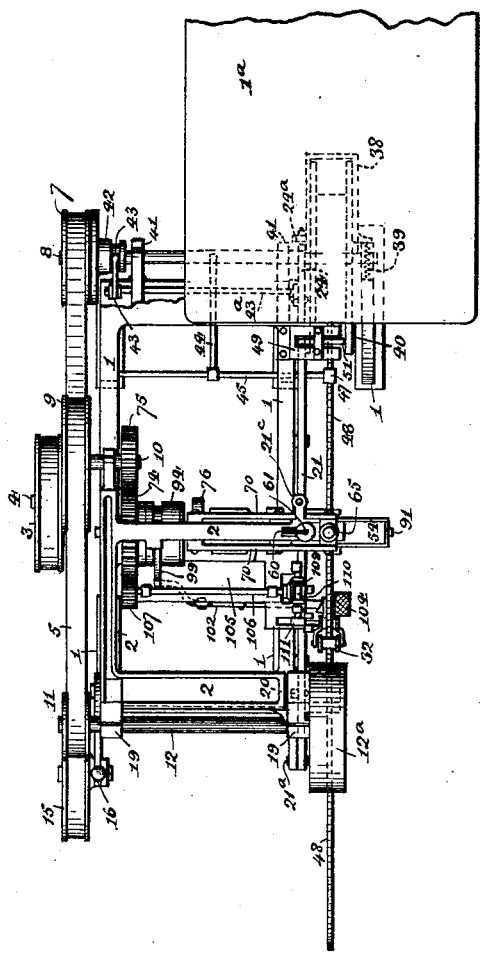

(No Model.) 5 Sheets—Sheet 3.
G. A. WATKINS.
CANE SPLICING MACHINE.
No. 452,248. Patented May 12, 1891.
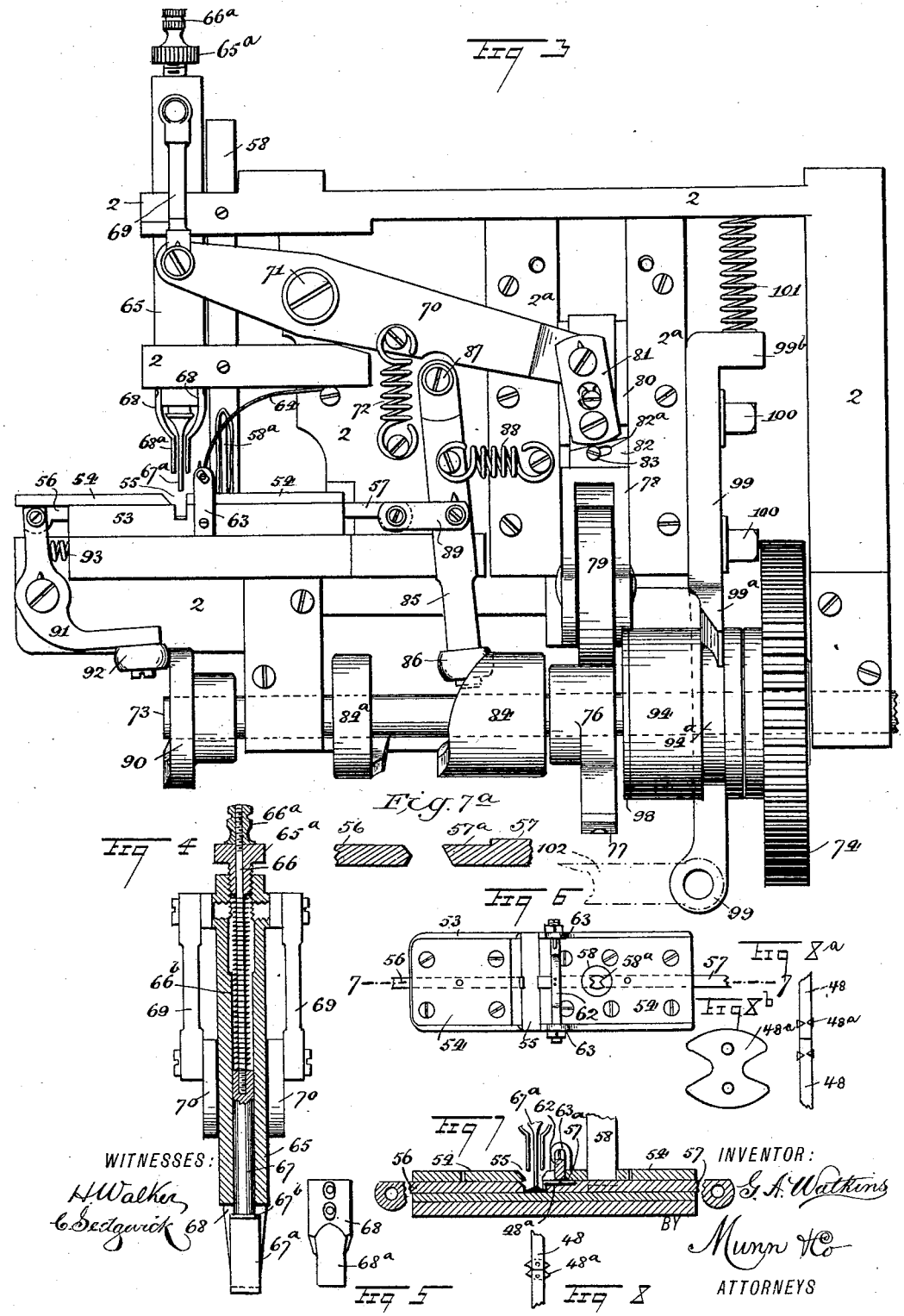
WITNESSES:
H. Walker
C. Sedgwick
INVENTOR:
G. A. Watkins
BY 
ATTORNEYS (No Model.) 5 Sheets—Sheet 4.
G. A. WATKINS.
CANE SPLICING MACHINE.
No. 452,248. Patented May 12, 1891.
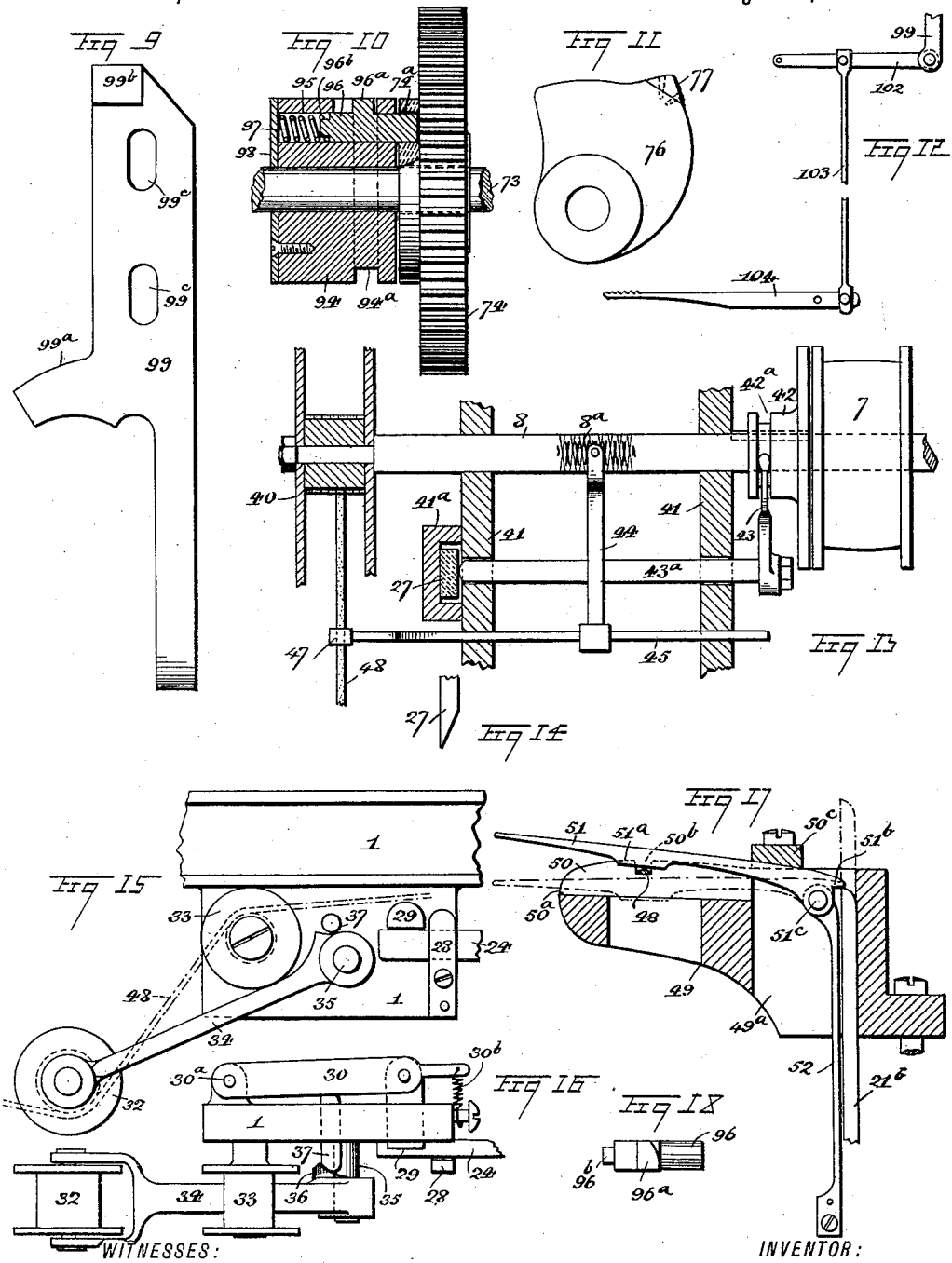
WITNESSES:
H. Walker
C. Sedgwick
INVENTOR:
G. A. Watkins
BY Munn & Co.
ATTORNEYS (No Model.) 5 Sheets—Sheet 5.
G. A. WATKINS.
CANE SPLICING MACHINE.
No. 452,248. Patented May 12, 1891.
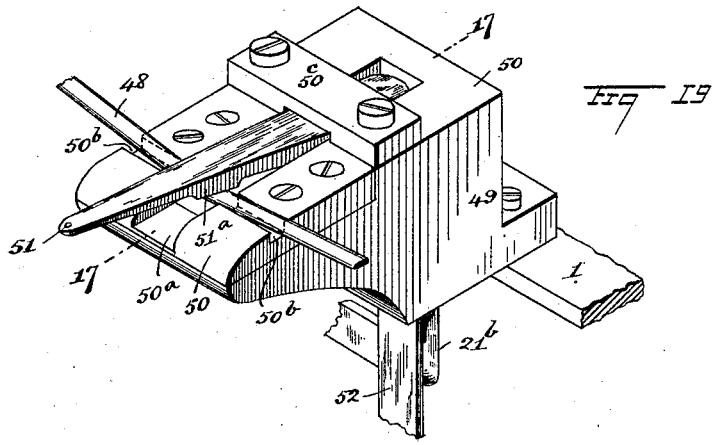
Fig. 19
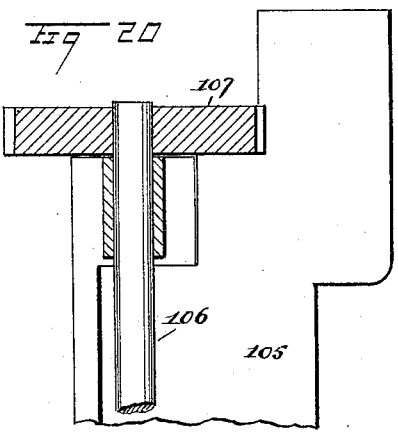
Fig. 20
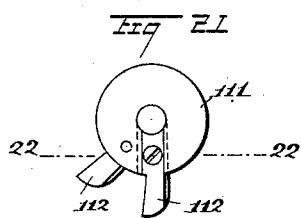
Fig. 21
Fig. 22
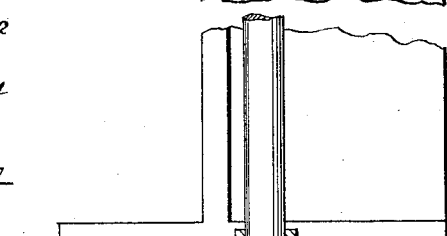
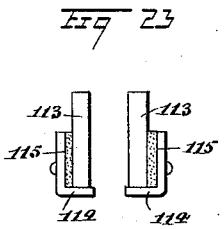
Fig. 23
WITNESSES:
H. Walker
C. Sedgwick
INVENTOR:
G. A. Watkins
BY Munn & Co
ATTORNEYS
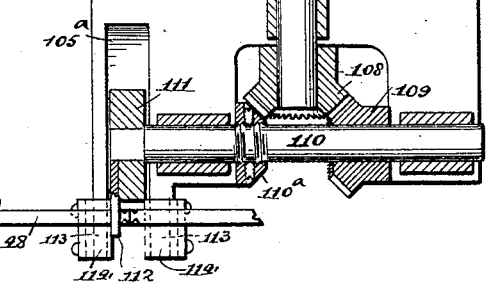

UNITED STATES PATENT OFFICE.

GARDNER A. WATKINS, OF GARDNER, MASSACHUSETTS, ASSIGNOR TO HEYWOOD BROTHERS & CO., OF SAME PLACE.

CANE-SPLICING MACHINE.

SPECIFICATION forming part of Letters Patent No. 452,248, dated May 12, 1891.

Application filed September 1, 1890. Serial No. 363,603. (No model.)

*To all whom it may concern:*

Be it known that I, GARDNER A. WATKINS, of Gardner, in the county of Worcester and State of Massachusetts, have invented a new and Improved Cane-Splicing Machine, of which the following is a full, clear, and exact description.

My invention relates to improvements in machines for splicing cane, willow rods, or other strands, such as are adapted to be used in the manufacture of furniture and similar goods.

In the manufacture of furniture and similar articles from cane the several pieces or strands of cane are first united in order to make a continuous strand. This strand is rolled upon a spool and the cane is then woven into the desired form.

The object of my invention is to produce a machine by means of which the cane may be easily, rapidly, and efficiently spliced, and by means of which it may also be evenly reeled.

To this end my invention consists in certain features of construction and combinations of parts, which will be hereinafter fully described, and then pointed out in the claims.

Reference is to be had to the accompanying drawings, forming a part of this specification, in which similar figures of reference indicate corresponding parts in all the views.

Figure 1 is a broken front elevation of the machine embodying my invention. Fig. 2 is a plan view of the same. Fig. 3 is an enlarged detailed view in side elevation of the mechanism for operating the plunger and the reciprocating jaws. Fig. 4 is an enlarged detailed view in vertical section of the plunger which forces the clasps upon the cane. Fig. 5 is an enlarged detailed view of one of the plunger-prongs. Fig. 6 is a detailed plan view of the grooved bed-plate in which the abutting canes are united. Fig. 7 is a longitudinal section of the same on the line 7 7 of Fig. 6; Fig. 7$^a$, a broken enlarged detail view of the adjacent ends of the clasp-folding jaws. Fig. 8 is a detailed plan view showing the application of the clasps to the abutting canes. Fig. 8$^a$ is the same view, but with the clasp folded around the cane. Fig. 8$^b$ is an enlarged detail view of one of the clasps used in splicing. Fig. 9 is an enlarged detailed view of the latch for operating the bolt in the clutch which is fixed to the shaft carrying the lever-operating cams. Fig. 10 is an enlarged broken detailed view, partly in vertical section, showing the connection between the gear-wheel on the cam-shaft and the clutch connecting with the same. Fig. 11 is a detailed view in side elevation of the cam which controls the movements of the plunger. Fig. 12 is a broken detailed view showing the lever mechanism for actuating the clutch-latch. Fig. 13 is an enlarged broken inverted view in horizontal section of the reeling mechanism. Fig. 14 is a broken detailed view of the wedge for actuating the friction-pulley of the reeling mechanism. Fig. 15 is an enlarged broken detailed view of the mechanism for releasing the lever which controls the spool-brake and the reeling mechanism. Fig. 16 is a detailed plan view of the same. Fig. 17 is a detailed view in vertical section on the line 17 17 of Fig. 19, showing the escapement of the lever governing the feed mechanism of the machine. Fig. 18 is a detailed view of the clutch-bolt which engages the gear-wheel on the cam-shaft. Fig. 19 is a broken enlarged perspective view of the escapement of the lever controlling the driving mechanism. Fig. 20 is a detailed plan view in horizontal section of the mechanism for cutting off the canes. Fig. 21 is a detailed side elevation of the cutter for cutting the canes. Fig. 22 is a transverse section of the same on the line 22 22 of Fig. 21; and Fig. 23 is a detailed end view of the cutter-jaws, showing the manner of adjusting the same.

1 is the main frame of the machine, having at one side at the top a suitable table 1$^a$ for carrying the cane to be spliced and having mounted upon the top a supplementary frame 2, which carries the plunger and jaw-operating mechanism, as hereinafter described.

The machine is provided with a main driving-wheel 3, mounted on a horizontal shaft 4, which is centrally located in the frame, and a belt 5 extends from the pulley 6, which is fixed to the shaft 4, around a pulley 7, which is fixed to a shaft 8, which is mounted on one side of the machine-frame, and which carries the reeling mechanism, as hereinafter described, the belt extending also from pulley 6 around the pulley 9, which is fixed to the shaft 10, said shaft being mounted in the frame 2 above the shaft 4 and carrying the plunger and jaw-operating mechanism, as hereinafter described, around a pulley 11, which is fixed to the shaft 12 on one side of the frame 2, around the pulley 13, mounted on the shaft 14, beneath the shaft 12, and around the pulley 15, which is located beneath the shaft 14, to the pulley 7, said pulley 15 being pivoted to a lever 16, which lever is in turn pivoted to the frame 1, so that by pulling outward upon the lever the belt 5 will be tightened and the machine started, and by pushing the lever inward the belt will be loosened and the machine stopped. Any suitable mechanism may be employed for holding the lever 16 in a desired position.

The shaft 12 carries a feed-roll $12^a$ and the shaft 13 carries a feed-roll $13^a$, the two feed-rolls vertically aligning, and when they are in contact the cane is inserted between them and is fed through in a manner described below. The lower roll $13^a$ is stationary in its bearings and the upper roll is vertically movable.

A pair of jaws 17 and $17^a$ are located on one side of the frame 2 adjacent to the feed-rolls $12^a$ and $13^a$, the said jaws meeting at a point opposite the contact-point of the rolls. The upper jaw 17 is fixed and the lower jaw $17^a$ is vertically movable, said jaw being connected by a link 18 with one of the boxes 19 of the shaft 12, so that when the jaw $17^a$ is raised to contact with the jaw 17 the feed-roll $12^a$ will be also raised, thereby suspending the feeding operation. The lower jaw $17^a$ is connected by a link 20 with the lever 21, said lever being pivoted on one side of the frame at the point $21^a$ and extending horizontally across the machine-frame, being bent at right angles at its free end, as shown at $21^b$, so as to extend vertically and engage the cane-holding latch, as hereinafter described. The lever 21 is pressed normally upward by a spring $21^c$, which is fixed to the lever and to the upper portion of the frame 2. The lever is connected by a rod 22 to a horizontal treadle-lever 23, which is pivoted to the lower portion of the frame 1. A lever 24 extends horizontally beneath the lever 21, being pivoted to a suitable support near its outer end at the point 25, said lever having a depending end $24^a$, which engages the spool-brake, as hereinafter described. From the lever 24 a finger 26 extends upward for contact with the lever 21, and pivoted to the lever near its fulcrum is a depending wedge 27, which controls the reeling mechanism, as hereinafter described. The free end of the lever 24 rests in a keeper 28, which is open at the top and which is fixed to a portion of the frame 1, and the lever is normally prevented from swinging upward by the latch 29, which extends through a slot in the frame 1 adjacent to the keeper 28 and rests upon the upper edge of the lever 24. The inner end of the latch 29 is pivoted to a lever 30, which is pivoted at one end at the point $30^a$ to the frame 1, and which has at its opposite end a spring $30^b$, connecting it with the frame, and which normally holds the lever against the frame, so that the latch 29 will be above the lever 24.

A pulley 31 is pivoted on one side of the frame 1 just below the feed-roll $13^a$. A similar pulley 33 is pivoted on the front portion of the frame nearly opposite the pulley 31, and a similar pulley 32 is located between and a little below the pulleys 31 and 33, but in vertical alignment with said pulleys, the pulley 32 being pivoted to a bifurcated arm 34, which is pivoted at its opposite end to a stud 35 on the frame 1. A pin 37 extends horizontally through the frame 1 and is vertically movable therein, the inner end of the pin impinging upon the side of the lever 30 and the outer end of the pin being adjacent to the pivoted end of the arm 34. The arm 34 is provided with a side cam 36 adjacent to its pivoted end, said cam being adapted to engage the end of the pin 37.

The cane which has been spliced and which is to be wound is fed between the feed-rolls $12^a$ and $13^a$, the cane passing above the pulley 31, below the pulley 32, and above the pulley 33 to the spool, and the tension of the cane causes the pulley 32 to be pressed upward, and when the jaws 17 and $17^a$ are closed upon the cane and the tension increased the cam 36 presses inward upon the pin 37, thereby actuating the lever 30 and pulling the latch 29 from above the lever 24, thus allowing the lever to swing upward and letting the brake engage the winding-spool, as described below.

A brake 38 incloses the outer portion of the winding-spool 40, the brake being pivoted near its upper portion and provided at its lower extremity with a spring 39, connecting it with the frame 1, and the spring normally holds the brake in engagement with the spool. The spool 40 is fixed to one end of the shaft 8, being removably attached thereto, so that when one spool is full another may be substituted in its place. The shaft 8 is mounted in suitable supports 41, which are fixed to the main frame, and mounted loosely upon the shaft next the pulley 7, which drives it, is a friction-disk 42, having a groove $42^a$ in its hub, the abutting ends of the pulley 7 and the disk 42 being leathered to increase the friction between them. A fork 43 engages the groove $42^a$ in the disk 42, the outer end of said fork being fixed to a rod $43^a$, which moves longitudinally in the supports 41, one end of the rod extending into the box $41^a$, attached to one of the supports 41. The box $41^a$ is adapted to receive the wedge 27, which is pivoted to the lever 24, as described above, so that when the wedge is forced downwardly into the box the rod $43^a$ will be moved longitudinally and the disk 43 forced against the pulley 7. It will be observed that the pulley 7 is mounted loosely upon the shaft 8, and the disk 42 is keyed to the shaft so as to slide longitudinally thereon, but so that when turned the shaft will be also turned, and when the disk is forced against the pulley the shaft 8 will be consequently driven and the spool 30 revolved.

Near the center of the shaft 8, between the supports 41, is a double screw-threaded portion $8^a$, the two screw-threads having opposite pitch, and the screw-threads are engaged by the bifurcated end of the arm 44 in a well-known manner, so that as the shaft revolves the arm will be moved first in one direction and then in the opposite direction, the arm alternately traveling the length of each screw-thread. The outer end of the arm 44 is fixed to a rod 45, which has a vertical rod 46 coupled thereto, and to the upper end of this rod is a guide 47, through which the cane 48 passes to the spool 40. The double screw-thread $8^a$ should be arranged in relation to the spool 40 so that the arm 44 and the connecting-rods 45 and 46 will be actuated in such a manner as to move the cane 48 back and forth and cause it to be evenly wound upon the spool.

On one side of the top of the frame 1 and in front of the table $1^a$ is a horizontal bar 49, having a vertical slot $49^a$ in one end thereof, and the bent end $21^b$ of the lever 21 extends into this slot and is vertically movable therein, as described below. A plate 50 is fixed to the top of the bar 49, the plate being vertically slotted to correspond with the slot $49^a$ of the bar, and the plate is also provided with a longitudinal slot $50^a$ and with transverse grooves $50^b$ on each side of the slot $50^a$, the said grooves being adapted to receive the cane 48. A latch 51 swings vertically in the groove $50^a$, which is spanned by a cross-bar or keeper $50^c$, the latch having on its under side a projection $51^a$, which comes opposite the grooves $50^b$ and is adapted to rest upon the cane 48, and having also at its rear end an offset or shoulder $51^b$, which engages the upper end of the bent portion $21^b$ of the lever 21, and thus prevents the lever from moving upward. The latch 51 is pivoted at the point $51^c$, adjacent to the shoulder $51^b$, to the flat spring 52, which extends vertically through the slot $49^a$ in the bar 49 and is fixed at its lower end to the machine-frame. This spring thus allows for the vertical movement of the lever 21, the spring and latch being moved horizontally when the lever moves vertically. The latch 51 is normally held in an elevated position by the cane 48, upon which it rests, and when the cane is drawn through the groove $50^b$ and from beneath the latch the latch drops, thus releasing the bent end of the lever 21 from engagement with the shoulder $51^b$ of the latch, and the lever is forced upward by the spring $21^c$, and it will be seen that when the lever is moved upward the jaws 17 and $17^a$ are forced together, thus preventing cane from being lost from between the feed-rolls, and the feed-rolls are separated, thereby preventing the cane from being fed.

At the same time the increased tension on the cane causes the cam 36 to act on the pin 37 and release the lever 24, as described, so that the lever will move upward with the lever 21, and when the lever 24 moves upward the wedge 27 is removed from the box $41^a$, thus stopping the movement of the shaft 8, and the brake 38 is forced by the spring 39 upon the spool 40, so that all parts of the feed mechanism are automatically stopped upon the removal of the cane from beneath the latch 51.

A bed-plate 53 is mounted horizontally above the frame 1, said bed-plate being covered by a cap 54, through which is a transverse slot 55 to permit the necessary movement of the plunger, and a groove is thus formed comprising said slot and the space between the reciprocating jaws 56 and 57, which move horizontally in the bed-plate beneath the cap 54. The jaws 56 and 57 reciprocate on the bed 53 and are timed so that they will approach each other and meet or nearly meet over the cane 48, which passes between them. The adjacent ends of the jaws are slightly beveled, as shown in Fig. 7, so that their lower parts will fit the cane nicely, and when the jaws approach each other they first strike the points of the clasps $48^a$, which points project from the sides of the cane. The points of the clasps are thus doubled or folded up over the cane, and the beveled portion of the jaws presses the clasp-points into place. The jaw 57 has upon its upper face and on the edge next the groove 55 a recess $57^a$ corresponding in thickness to the thickness of one of the clasps $48^a$ which are to be attached to the cane. Extending vertically through the cap 54, so as to deliver clasps upon the recessed end of the jaw 57, is a vertical chute 58, carrying the clasps which are to be attached to the cane. The chute 58 is provided on the inner side with ribs $58^a$ to adapt its inner diameter to the shape of the clasps, and the clasps are packed closely within the chute.

A magazine 59, corresponding in its inner contour with the inner contour of the chute 58, is mounted vertically above the chute 58, so as to align therewith. The clasps have been previously assembled in the magazine 59, and when a magazine is emptied another one is substituted in its place. The magazine forms no part of my present invention, as I have already filed an application for Letters Patent of the United States for the same, which application was filed June 30, 1890, and is serially numbered 327,283.

A guide 60 is arranged above the magazine 59, and a follower $60^a$ extends through the guide and into the magazine, the follower being provided with a suitable weight 61, which presses the follower downward, so that the clasps are forced through the magazine 59 and chute 58 upon the jaw 57. The movement of the jaw 57 is such that the recess $57^a$ will be brought beneath the chute 58 at each stroke of the jaw, as indicated by the dotted lines in Fig. 7. A pawl 62 is pivoted in suitable supports 63 above the recess 57ᵃ of the jaw, the said pawl having a depending brad or tongue, as shown in Fig. 7, to enable it to engage the clasp, and fixed to the top of the pawl and to a portion of the frame 2 is a slender spring 64, which assists in enabling the pawl to return to a vertical position.

A plunger 65 is mounted in suitable supports attached to the frame 2, so as to extend vertically above and at right angles to the groove 55 in the bed-plate 53, said plunger being hollow throughout its entire length. The upper end of the plunger is closed by a screw-cap 65ᵃ, having a vertical perforation through it, and a rod 66 extends through the perforation in the cap 65ᵃ and downward into the plunger 65. The top of the rod 66 is provided with a suitable thumb-nut 66ᵃ, and the lower end of the rod is screwed into the tongue 67, which moves vertically in the plunger, the lower end of the tongue being widened and flattened, as shown at 67ᵃ, said flattened portion extending below the plunger and being adapted to rest upon the cane, as described below. A spiral spring 66ᵇ encircles the rod 66, the upper end of the spring pressing against the screw-cap 65ᵃ and the lower end against the tongue 67. The tongue 67 is provided with a shoulder 67ᵇ at the upper end of the widened portion 67ᵃ, and said shoulder limits the upward movement of the tongue. The prongs 68 are screwed to the plunger 65 on opposite sides of the tongue 67, the said prongs being curved inwardly and having a vertical portion 68ᵃ extending parallel with the lower end 67ᵃ of the tongue 67. It will thus be seen that when the plunger descends the tongue will rest upon the cane and will yield slightly, and when the prongs 68 touch the clasp they will jam the clasp firmly upon the cane and cause it to be embedded in the same. This operation will be further described hereinafter.

Pivoted to the plunger 65 on opposite sides and near the upper part are the depending arms 69, which are pivoted at their lower ends to the bifurcated end of the lever 70, said lever being pivoted on the stud 71 and held normally, so as to retain the plunger in an elevated position by the spring 72, one end of which is fixed to the lever and the other end to a portion of the frame 2. The lever 70 is connected with the operating-cams, as hereinafter described.

A shaft 73 is mounted horizontally in the lower portion of the frame 2 and parallel with the shaft 10, said shaft having loosely mounted upon one end a gear-wheel 74, which meshes with the gear-wheel 75 on the shaft 10. A cam 76 is fixed to the shaft 73, said cam being adapted to operate the plunger, and on the outer extremity of the cam, at the point which imparts the final stroke to the plunger, is a removable piece 77. The cam has to be nicely adjusted in order to regulate the plunger-stroke, and by having the piece 77 removable it may be taken off and brought to the required shape and thickness much easier than the cam could be shaped if made in a single piece.

Located above the cam 76 and aligning with the shaft 73 is a frame 78, which moves vertically between the supports 2ᵃ, which are attached to the frame 2, the said frame having pivoted therein a roller 79, which contacts with the cam 76. A frame 80 is movable between the supports 2ᵃ above the frame 78, and pivoted on the frame is a link 81, the upper end of which is pivoted to the lever 70, and a wedge 82 is interposed between the frame 78 and the link 81 in order to more nicely adjust the plunger-stroke. The wedge 82 has a longitudinal slot 82ᵃ therein, through which extends a screw 83, by means of which the wedge may be adjusted. A side cam 84 is fixed to the shaft 73 next the cam 76, and opposite said cam and a little distance from the same is a corresponding cam 84ᵃ, which acts as a follower to make sure the return of lever 85. The lever 85 is pivoted at its upper end to the stud 87, and at its lower end is provided with a roller 86, which presses against the surface of the cam 84, the lever being held against the cam by the spring 88. The lever 85 aligns with the jaw 57 and is pivotally connected therewith by a link 89. The convolutions on the cam 84 are such as to actuate the lever 85 and jaw 57, so that the jaw, starting from the position shown in Fig. 7, its position of rest, moves forward until the clasp is folded on the cane, then backward until the recess 57ᵃ is beneath the clasp-chute 58, and then forward again to push the clasp 48, which has been dropped into the channel of the jaw, into the slot 55, when it rests ready for the next operation.

On one end of the shaft 73 is a side cam 90, and pivoted to the frame 2 above the shaft is a curved lever 91, having at its lower end a roller 92, which presses against the face of the cam 90, and the upper end of the lever is pivotally connected to the outer end of the jaw 56. The lever 90 is tilted and the roller 92 held normally against the face of the cam 90 by means of the spiral spring 93, which is interposed between the upper end of the lever and a portion of the machine-frame. A clutch 94 is fixed to the shaft 73 adjacent to the gear-wheel 74, said clutch having an annular groove 94ᵃ therein, and having also a lateral slot or recess 95, which aligns with the transverse recesses 74ᵃ in the hub of the gear-wheel 74. A bolt 96 slides in the recess 95 of the clutch and is held normally by the spiral spring 97, so as to be pressed into one of the recesses 74ᵃ of the gear-wheel, and the spring is held in place by a cap 98, which is screwed to one end of the clutch. The bolt 96 has a beveled projection 96ᵃ thereon (see Fig. 18) and has at one end a projection or stud 96ᵇ, which extends into the spiral spring 97. It will thus be seen that the clutch and gear-wheel are normally in engagement, so that when the gear-wheel is turned the shaft 73 will be turned, and the cams thereon will actuate the plunger and jaw-operating levers.

A latch 99 is arranged vertically adjacent to the clutch 94 and in alignment with the groove 94ª, the said latch having centrally thereon a projecting beveled prong 99ª to engage the beveled portion of the bolt 96, and the upper end of the latch is bent at right angles, as shown at 99ᵇ, the latch being fastened to one of the supports 2ª, so as to have a limited vertical movement by the bolts 100, which extend through the elongated slots 99ᶜ in the latch. The latch 99 is normally pressed downward, so as to engage the bolt 96 and force it from engagement with the gear-wheel 74, by the spring 101, which is interposed between the bent end 99ᵇ of the latch and the upper portion of the frame 2. The lower end of the latch is pivoted to a horizontal lever 102, which is connected by a rod 103 with the treadle-lever 104, said lever being pivoted at a convenient point at the base of the frame 1. It will thus be seen that the mechanism for operating the plunger and the jaws which bend the clasp is controlled by the treadle-lever 104, as when the treadle is depressed the lever 99 is raised and the clutch 94 engages the gear-wheel 74, and when the treadle is raised the latch is depressed and the beveled prong 99ª of the latch engages the beveled portion 96ª of the bolt 96, thus forcing the bolt from the gear-wheel and allowing the gear-wheel to turn loosely on the shaft 73.

It is necessary that the ends of the cane to be united should be solid and square, and therefore mechanism is provided for cutting off the ends of the cane. This will be described below.

A plate 105 is fixed to the top of the frame 1, and mounted in suitable bearings on the frame is a shaft 106, which extends parallel with the shaft 73 and to the front of the machine. The rear end of the shaft 106 has fixed thereto a gear-wheel 107, which meshes with the gear-wheel 74, and on the opposite end of the shaft is a miter-gear 108, which meshes with the corresponding gear 109 on the shaft 110, said shaft being mounted in suitable bearings at right angles to the shaft 106. A suitably-beveled adjusting-collar 110ª is screwed upon the shaft 110, and by changing the position of the collar the position of the gears 108 and 109 in relation to each other may be easily adjusted.

On one end of the shaft 110 is a disk 111, which revolves in a recess 105ª of the plate 105, said disk having cutters 112 affixed to opposite sides thereof and extending radially but not opposite each other. The plate 105 has two projecting arms 113, and fixed to the outer sides of the said arms are the jaws 114, which are screwed thereto, said jaws being bent to overlap the arms 113, and the inner edges of the jaws should be arranged to shear the cutters 112. A packing-piece 115 is inserted between the cutters and the arms, and by changing the thickness of the packing the jaws may be adjusted. To cut off the cane it is merely placed above the arms 113, and the revolving cutters instantly sever it.

The operation of the machine is as follows: The operator stands in front of the machine, and the cane is inserted between the jaws 17 and 17ª and the feed-rolls 12ª and 13ª, so as to extend above the pulley 31, below the pulley 32, and above the pulley 33 to the spool 40 upon which it is wound. To start the feed mechanism the operator depresses the treadle 23. This depresses the lever 21, thus separating the jaws 17 and 17ª and bringing the feed-rolls 12ª and 13ª upon the cane 48 between them, thus feeding the cane. At the same time the lever 24 is depressed by reason of its connection with the lever 21, and this movement causes the bent end 24ª of the lever to force the brake 38 from the cane-spool 40 and forces the wedge 27 into the box 41ª, thereby throwing the disk 42 into contact with the pulley 7 and driving the shaft 8, and when the shaft 8 is revolved the pulley 40 is also revolved and the arm 44 and rods 45 and 46 are actuated so as to guide the cane 48 properly upon the spool 40. When a union is to be made, a piece of cane is drawn beneath the latch 51, so as to enter the groove 50ᵇ in the plate 50, and the abutting ends of the cane, if not already square, are squared by the cutting mechanism, as described above, and the ends are then placed together in the groove 55 of the bed-plate 53 beneath the plunger 65. The operator then steps upon the treadle 104, thereby raising the latch 99 and throwing the clutch 94 and gear-wheel 74 into engagement, so that the shaft 73 is revolved. As the shaft revolves, the cam 76 raises the roller 79 and frame 78, which, operating on the link 81, raises the one end of the lever 70 and depresses the opposite end, thereby forcing the plunger 65 downward. At the same time the cams 84 and 90 will actuate the levers 89 and 91, thus forcing the jaws 56 and 57 together, and the jaws will strike the sides of the clasp, which has first been deposited in the bottom of the groove 55, and bend the clasp upon the abutting ends of the cane, the inner edges of the jaws being shaped to facilitate this operation. As the plunger 65 descends, the lower end 67ª of the tongue 67 strikes the cane and yields slightly, but presses downward sufficiently to hold the cane in place. As the plunger continues to descend, the prongs 68 thereof strike the upper side of the clasp and cause it to be firmly embedded in the cane, thus making a perfect joint. The plunger is then raised and the jaws withdrawn ready for another operation. As the jaws recede the pawl 62 impinges upon a clasp 48ª, which has been deposited in the recess 57ª of the jaw 57, and brushes the clasp from its seat, so that it falls in the wake of the jaw to be pushed forward into the slot 55 on the return of the jaw. The jaw continues to recede until the recess 57ª is brought beneath the clasp-chute 58, when a new clasp falls into the recess and the jaw reciprocates its motion, coming forward until the new clasp is under the pawl 62 and the clasp 48ª has been pushed farther front into the slot 55. The above operation is all accomplished at one revolution of the shaft 73, and the cams 76, 84, and 73 should be shaped and timed in relation to each other so that the above movements will be carried out as described. Upon removing the pressure from the treadle 104 the latch 99 disengages the clutch 94 from the gear-wheel 74, and the plunger and jaw operating levers are stopped, and when the cane is drawn from beneath the latch 51 the lever 21 is forced upward by the spring 21ᶜ, thus separating the feed-rolls 12ª and 13ª and causing the jaws 17 and 17ª to close upon the cane. The tension on the cane causes the pulley 32 to be raised, thus actuating the arms 34 and cam 36 and releasing the lever 24, which is then raised by reason of its connection with the spring brake-shoe 38, thus allowing the brake to come in contact with the spool 40, and it also removes the wedge 27 from the box 41, thereby stopping the friction between the pulley 7 and disk 42 and stopping the shaft 8.

From the foregoing description it will be seen that the machine is automatic in its principal movements and that by means of it the cane may be rapidly and efficiently spliced.

Having thus fully described my invention, I claim as new and desire to secure by Letters Patent—

1. A cane-splicing machine comprising a bed, opposite reciprocating jaws held to slide on the bed and provided with beveled adjacent ends, one of the jaws having a clasp-holding recess therein, means for pushing a clasp from the recess, and a yielding plunger arranged to strike between the jaws, substantially as shown and described.

2. A cane-splicing machine comprising a bed and a plunger movable at right angles to the bed, said plunger having a spring-pressed tongue and rigid prongs on opposite sides of the tongue, substantially as described.

3. In a cane-splicing machine, the hollow plunger having a spring-pressed tongue therein and having the rigid prongs extending nearly parallel with the tongue, substantially as described.

4. A cane-splicing machine comprising a bed, a movable plunger at right angles to the bed, reciprocating jaws held to slide on the bed, one of the jaws having a clasp-holding recess next the groove, as shown, and a pawl pivoted above said recess, substantially as described.

5. A cane-splicing machine comprising a bed, reciprocating jaws mounted on the bed, one of the jaws having a clasp-holding recess, as shown, a clasp-chute delivering upon the recessed jaw, and means for brushing the clasp from the jaw, substantially as shown and described.

6. In a cane-splicing machine, the combination, with the reciprocating recessed jaw, of the pawl pivoted above the jaw and adapted to operate by the movement of the jaw, substantially as described.

7. In a cane-splicing machine, the combination, with the grooved bed and the reciprocating recessed jaw, of a clasp-chute delivering upon the jaw, and a pawl pivoted above the recess of the jaw, substantially as described.

8. In a cane-splicing machine, the combination, with the vertically-movable plunger having arms pivoted to the sides thereof, of a lever pivoted to the frame and connected at one end to the plunger-arms and at the opposite end to a vertically-adjustable link, a vertically-movable frame below the link having a roller pivoted therein, and a revolving cam beneath the roller, substantially as described.

9. In a cane-splicing machine, the combination, with the revoluble shaft carrying the lever-operating cams, as shown, and a gear-wheel mounted loosely on the shaft and meshing with the driving gear, as described, said gear-wheel having transverse slots therein, of a clutch fixed to the shaft and carrying a spring-pressed bolt to engage the slots of the gear-wheel, and a lever mechanism for releasing the bolt, substantially as described.

10. In a cane-splicing machine, the combination, with the shaft carrying the lever-operating cams, as shown, and the gear-wheel mounted loosely on the shaft and provided with a transverse slot, of the clutch fixed to the shaft and provided with a transverse slot and an annular groove, the spring-pressed bolt located within the slot of the clutch and adapted to engage the gear-wheel, a vertically-movable latch having a beveled prong to engage the bolt in the clutch, and a lever mechanism for operating the latch, substantially as described.

11. In a cane-splicing machine, the combination, with a fixed and a movable jaw, of a feed-roller having fixed bearings and a vertically-movable feed-roll adapted to contact therewith, the jaws and feed-rolls being adapted to close alternately, substantially as described.

12. In a cane-splicing machine, the combination, with a fixed and a movable jaw, the movable jaw being connected by a lever mechanism with a suitable treadle, of a pair of feed-rolls adjacent to the jaws, one of said feed-rolls being vertically movable and being connected with the movable jaw by a suitable link, substantially as described.

13. The combination, with the cane-holding jaws and the feed-rolls connected therewith, of the slotted bar, the cane-holding latch pivoted in the bar and provided near its fulcrum with a projecting shoulder, and the spring-pressed bent lever having one end arranged to engage the shoulder of the latch and having connection with a suitable treadle, substantially as described.

14. The combination, with the spring-pressed bent lever having connection with a suitable treadle and with the cane-holding jaws and feed-rolls, in the manner described, of the vertically-slotted bar having on its upper edge longitudinal and transverse grooves, as shown, and the spring-latch pivoted in the vertical slot of the bar and provided with a projecting shoulder to engage the bent end of the lever, substantially as described.

15. The combination, with the main lever connected with the feed mechanism, as described, and the spring-pressed brake-shoe pivoted opposite the cane-winding spool, of a supplementary lever pivoted below the main lever, said supplementary lever having a bent end to impinge upon the brake-shoe, substantially as described.

16. The combination, with the main lever provided with a suitable treadle and connected with the feeding mechanism, as described, and the supplementary lever pivoted below the main lever and connected therewith, of a friction-disk mounted on the winding-spool shaft adjacent to the loose driving-pulley thereon, a fork fitting a groove of the friction-disk, a rod connected with the fork and longitudinally movable in its bearing, a box at one end of the rod, and a wedge adapted to fit within the box, said wedge being connected with the supplementary lever, substantially as described.

17. The combination, with the supplementary lever connected with the winding mechanism, as described, of a keeper to support the free end of the lever, a laterally-movable latch adapted to engage the upper edge of the lever, and means for automatically releasing the latch when the main lever is released, substantially as described.

18. The combination, with the supplementary lever connected with the winding mechanism and supported in a keeper, as shown, of a laterally-movable latch adapted to engage the upper edge of the lever, a spring-pressed lever pivoted to the inner end of the latch, a sliding pin having its inner end impinging against the spring-pressed lever, a pair of pulleys pivoted on the machine-frame, an arm pivoted on the frame adjacent to the sliding pin and having a cam thereon to actuate the pin, and a pulley pivoted in the free end of the arm and adapted to operate the arm by the tension of the cane, substantially as described.

19. In a cane-splicing machine, the combination, with a fixed and an adjustable feeding roll and a clamp, of a spring-actuated main lever connected to the adjustable roll and the clamp, and a latch-lever for the main lever, substantially as described.

20. In a cane-splicing machine, the combination, with a clamp, a winding-drum, and a clutch connecting the said drum to its driver, of a lever adapted to disconnect said clutch, and a tension device adapted to release said lever, substantially as described.

21. In a cane-splicing machine, the combination, with a bed mounted on the machine-frame and provided with parallel arms, of a disk fixed to a revoluble shaft between the arms, radially-extending cutters fixed to the disk, and laterally-adjustable jaws mounted on the outer ends of the arms to shear the cutters, substantially as described.

GARDNER A. WATKINS.

Witnesses:
THATCHER B. DUNN,
EDW. G. WATKINS.